ered June 28, 1960

2,942,991
SLIP-CASTING PROCESS

Eric Smith, Springfield, Mass., assignor to Monsanto Chemicals Limited, London, England, a British company No Drawing. Filed Oct. 19, 1956, Ser. No. 616,942

Claims priority, application Great Britain Oct. 28, 1955

10 Claims. (Cl. 106—44)

This invention relates to slip casting processes for the manufacture of refractory articles.

The slip-casting process is a well-known method for making shaped refractory articles and can be described briefly as follows. A non-settling aqueous slurry of a finely-divided refractory material and a bonding agent is poured into a dry porous mould, which is usually made of plaster. The mould soaks up and absorbs water from the slurry, building up on its surface a coating of the particles of refractory material mixed with bonding agent from which water has been withdrawn, and thus forming a layer of solid material of even thickness conforming to the surface of the mould. When sufficient time has elapsed since pouring to give the desired thickness of coating on the mould surface, the excess slurry is poured off and the coating (or "casting") is allowed to dry. The dry casting is removed from the mould (this is easy as the casting shrinks slightly during drying), and is then fired to give it strength, which is usually provided by some chemical interaction between the particles of refractory material and the bonding agent.

In such slip-casting processes ceramic clays are widely used as the bonding agents for the refractory particles, and the initial slurry thus contains a fine dispersion of clay as well as refractory material. Clays, however, suffer from the disadvantages that they need careful preparation before use and they contain sodium or other metallic residues which impair the refractory properties of the castings.

It has now been discovered that instead of clays, silica sols can be used as the bonding agent in these slip-casting processes provided that the slurry of refractory material and colloidal silica is appropriately stabilized and its pH adjusted so that the slurry remains homogeneous on standing. Moreover, the silica in colloidal solution appears to associate itself in some unknown way with the particles of refractory material in the slurry and when such a slurry is employed in slip-casting a high proportion of the silica remains in the coating which provides the casting and is thus available for bonding the refractory material, instead of being absorbed into the porous mould with the water as would have been expected. This discovery enables the production by slip-casting processes of shaped refractory articles, in which the bonding agent is substantially pure silica.

It is not practicable to employ slurries consisting simply of aqueous silica sol and finely-divided refractory material, for there is a tendency for the refractory particles suspended in the silica sol to settle out on standing and in fact the association referred to above does not occur. If such a slurry is used in slip-casting, there is a tendency for the refractory particles to fall out of suspension and thus provide coatings which are thicker at the bottom of the mould than those accumulating at places higher up on the mould wall solely due to the absorbing action of the mould pores. Moreover, where a reservoir of slurry is maintained for pouring into the individual moulds, the slurry will tend to become unhomogeneous as the particles settle out, and the composition of the slurry used in a series of moulds will vary. The tendency for a slurry of finely-divided refractory material and silica sol to deposit refractory material on standing can be reduced or eliminated by the incorporation of a suitable organic stabilizing agent and appropriate adjustment of the pH. The stabilizing agents in some way enable the kind of association which is referred to above to occur, thus altering the nature of the surface properties of the particles of refractory material and enabling them to remain in suspension.

The process of slip-casting of the present invention is therefore one in which there is used an aqueous slurry comprising a finely-divided refractory material, a silica sol and a minor proportion of an organic stabilizing agent, the pH value of the slurry being such that it remains homogeneous on standing.

Silica sols which are suitable for use in the compositions of the invention include those which have been obtained by the ion-exchange process from sodium silicate, or by the so-called autoclave process employing a silica gel, such as the silica sols described in British Patents 607,696; 645,703; 649,897; 654,850 and 662,423. The concentration of silica in the silica sol used is preferably from 10% to 30% by weight and about 15% is particularly suitable. The silica sols sold under the registered trademark "Syton," such as those known as "Syton C," "Syton W–20," and "Syton 2X," which contain 15%, 15% and 30% by weight of silica respectively, are particularly suitable, and the 30% sol can, if required, be diluted with water to provide a 15% sol for direct use.

The powdered refractory material used will, of course, not be one which is sufficiently acidic or basic to cause the silica sol to gel rapidly. Suitable refractory materials are alumina, Carborundum, chromite, silica itself and silicates such as zirconium silicate and sillimanite. The particle size of the finely-divided refractory material is preferably such that it will pass through a British Standard sieve of 200 mesh to the inch.

Suitable organic stabilizing agents are non-ionic and cationic surface-active agents, and gelatin. Gelatin may be used in the form of a commercial product, such as animal glue.

Suitable non-ionic surface-active agents are condensation products of an alkylene oxide (for example ethylene oxide) with an organic substance containing a large non-polar group and an active hydrogen atom, for instance ethylene oxide condensates of long-chain fatty alcohols (such as the product sold under the name "Lubrol W"), the condensation products of ethylene oxide with alkyl-phenols, for instance an octylcresol (such as "Lissapol N"), and the condensation products of ethylene oxide with long-chain alkyl mercaptans, for example a dodecyl mercaptan. Another non-ionic surface-active agent which can be used is a polyethylene glycol fatty acid ester such as that sold under the name "Nonex 99." Examples of cationic surface-active agents which can be used are the quaternary ammonium salts such as the cetylpyridinium bromide sold under the name "Fixanol C," and cetyltrimethylammonium bromide.

The stability of the slurry containing the refractory material, silica sol and stabilizing agent is greatly influenced by its pH, and where necessary the pH must be suitably adjusted, by the addition of acid, for instance, after the ingredients of the slurry have been mixed. The most suitable pH for stability varies unpredictably with the particular production batch of silica sol used but it can easily be found by simple testing. Usually with a non-ionic surface-acting agent the pH which is suitable will be on the alkaline side of neutrality, but it may be found that comparatively low pH values are acceptable when the proportion of non-ionic surface-active agent present is small. Where gelatin is used as the stabilizing agent, the pH value is desirably less than 7.

The proportions of silica sol to powdered refractory material and any added water used will depend in any given instance on the thickness or "viscosity" of the slurry desired. The most suitable amount of stabilizing agent employed in any particular slurry will depend to some extent on the nature of the stabilizing agent as well as on the other materials present, but in general up to 1% of stabilizing agent is sufficient and it is unnecessary or undesirable to add as much as 4% or 5% or more. Where a non-ionic surface-active agent is employed, from 0.05% to 1% by weight of surface-active agent is usually sufficient, and where a cationic surface-active agent is used even small quantities are suitable. Where gelatin is used as stabilizing agent, an amount corresponding to about 0.04% by weight of the slurry is usually sufficient, though more can be added if desired.

The viscosity of a slurry used in the process of the invention is not critical and can be within a wide viscosity range. It should, however, not be too low, as the casting obtained then shrinks little on drying and consequently release from the mould is not easy. On the other hand if the viscosity of the slurry used is very high, cracks tend to appear in the casting, either while the casing is being formed in the mould or when it is dried. If the viscosity of the slurry is gauged by measuring the time taken for a given volume to flow through a standard pipette and comparing it with the time taken for water to do the same, then as a general guide, where the flow time for water is 30 seconds, a very satisfactory flow time for a slurry suitable for use in the process of the invention is from 70 to 160 seconds.

In some instances where non-ionic surface-active agents are used as the stabilizing agents, it may be found that the viscosity of the slurry produced increases markedly on standing, although the silica sol does not gel. This behaviour appears to depend to a considerable extent on the pH of the slurry. It is possible to reduce any tendency of the slurry to thicken or increase in viscosity on standing, or even reduce to the desired extent the viscosity of a slurry which is already thickened, by incorporating in addition to the non-ionic surface-active agent an anionic surface-active agent, for instance an alkylaryl sulphonate (for example sodium dodecyl benzene sulphonate), a salt of an alkyl hydrogen sulphate (for example sodium lauryl sulphate, sodium cetyl sulphate or one of the commercial detergents sold under the names "Teepol" and "Iranopol"), and an alkyl sulphosuccinate (for example sodium dioctyl sulphosuccinate or the substance sold under the name "Alcopol O"). Of the anionic surface-active agents which may be used to reduce the thickening of a slurry in which a non-ionic surface-active agent is present there is usually necessary only a small amount in proportion to the non-ionic substance.

Thickening of a slurry which has already occurred can generally be reduced by increasing the pH of the slurry by careful addition of an alkali, for example ammonia. Slurries prepared using gelatin as stabilizing agent show a tendency to be more viscous with decreasing pH, and their viscosity can be controlled by adjustment of pH. The viscosity of any slurry can of course also be readjusted by the incorporation of additional quantities of one or more of its ingredients.

In carrying out the slip-casting process, the time for which the slurry needs to stand in the mould before excess slurry is poured off is not only dependent on the thickness of the casting required and the absorbing characteristics of the mould, but also on the viscosity of the slurry. In practice the period between pouring in the slurry and pouring off excess is usually between 2 and 10 minutes.

After the slurry has been poured off it is preferable to allow the mould containing the casting to stand for a few hours at room temperature in the open, and it is then suitable to place the mould containing the casting in a drying oven maintained at a temperature below 100° C., and conveniently between 50° C. and 80° C. After drying for a suitable period the shrunk casting is removed from the mould, and can then be fired and treated by other processes to give the finished article desired. The mould is then repeatedly re-used.

The invention is illustrated by the following examples.

*Example 1*

Comminuted zirconium silicate passing a 200 mesh British Standard sieve (3.5 kg.; the material used was that sold under the name "Zircosil D") was added in portions with vigorous stirring to a mixture of Syton C (1200 cc.; Syton C is a silica sol prepared by the so-called autoclave process and containing 15% by weight of $SiO_2$) and 30 cc. of an aqueous solution containing 50% by weight of a non-ionic surface-active agent sold under the name "Lissapol N" (a condensation product of ethylene oxide and octylcresol): 10 cc. of 1% hydrochloric acid were then added and stirring continued for a few minutes. The pH of the slurry thus prepared was 8.4. Its "viscosity" is indicated by the time taken for 50 cc. of the slurry at a temperature of 20° C. to flow from a pipette held vertically, which was 85 seconds, while the time taken for an equal volume of water to flow from the pipette under identical conditions was found to be 30 seconds.

The slurry was poured into a dry plaster mould, allowed to stand for 5 minutes, and the excess slurry was then poured off. The mould containing the casting was then air dried at room temperature for two hours and placed in an oven at 80° C. overnight. The casting, which was in the form of a basin of wall thickness 3/16 inch, was easily removed from the mould and successfully fired to 900° C. to give a refractory article of satisfactory strength and surface finish.

*Example 2*

A slurry of fused alumina (175 g., passing a 200 mesh British Standard sieve), Syton C (80 cc.), the non-ionic surface-active agent "Lissapol N" (0.75 cc.) and 1% hydrochloric acid (6.3 cc.) was prepared in a manner similar to that described in Example 1. This slurry was poured into a bone dry plaster mould at room temperature and allowed to stand for 10 minutes. The excess slurry was then poured off and the mould and casting were air dried at room temperature and afterwards placed in an oven at 65° C. overnight. The casting, of 1/4 inch thickness, was easily removed from the mould and fired to 900° C., giving a refractory article having a good surface finish and satisfactory strength.

*Example 3*

A slurry of comminuted zirconium silicate passing a 200 mesh British Standard sieve (175 g.) was added with stirring to Syton C (60 cc.) in which was incorporated 0.6 g. of an aqueous solution containing 10% by weight of cetylpyridinium bromide (Fixanol C). The slurry had a flow time (see Example 1) of 51 seconds.

The slurry was poured into a plaster mould, allowed to stand for 5 minutes, and the excess slurry then poured off. The mould and casting were air dried at room temperature for 2 hours and then overnight at 98° C. Removal of the casting from the mould, and firing to 900° C., gave a satisfactory refractory article.

*Example 4*

Gelatin (0.1 g.) was dissolved with gentle warming in Syton C (60 cc.; pH 9.7) and to the solution thus obtained comminuted zirconium silicate (175 g., passing a 200 mesh British Standard sieve) was added in portions with vigorous mechanical stirring. When addition of the zirconium silicate had been completed, sufficient dilute hydrochloric acid was added slowly and with stirring to produce a slurry of pH 5.5. It was found that this could be used successfully in a process of slip-casting similar to those described in the above examples.

What is claimed is:

1. A slip-casting process, in which the slurry used to form the wet casting on the porous mould is an aqueous slurry consisting essentially of a finely-divided refractory material, a silica sol whose silica content is in the range of from 10% to 30% by weight, and a stabilizing amount up to 1% by weight of an organic stabilizing agent selected from the group consisting of a non-ionic surface-active agent and a cationic surface-active agent, said slurry having a pH such that the slurry remains homogeneous on standing, said refractory material being composed of particles which pass through a 200 mesh British Standard sieve and being selected from the group consisting of alumina, Carborundum, chromite, silica, zirconium silicate and sillimanite, said cationic surface-active agent being selected from the group consisting of quaternary ammonium salt surface-active agents and gelatin, the weight ratio of silica to the finely divided refractory material being from 9 to 12 parts by weight of silica for each 175 parts by weight of the refractory material.

2. A slip-casting process, in which the slurry used to form the wet casting on the porous mould is an aqueous slurry consisting essentially of a finely-divided refractory material, a silica sol whose silica content is in the range of from 10% to 30% by weight, from 0.05 to 1% by weight of a non-ionic surface-active agent, an anionic surface-active agent, said slurry having a pH such that the slurry remains homogeneous on standing, said refractory material being composed of particles which pass through a 200 mesh British Standard sieve and being selected from the group consisting of alumina, Carborundum, chromite, silica, zirconium silicate and sillimanite, the weight ratio of silica to the finely divided refractory material being from 9 to 12 parts by weight of silica for each 175 parts by weight of the refractory material.

3. The slip-casting process of claim 2 wherein the anionic surface-active agent is an alkyl aryl sulfonate.

4. The slip-casting process of claim 1 wherein the refractory material is zirconium silicate and wherein the organic stabilizing agent is a non-ionic surface-active agent.

5. The slip-casting process of claim 1 wherein the organic stabilizing agent is cetyl pyridinium bromide.

6. A slip-casting process, in which the slurry used to form the wet casting on the porous mould is an aqueous slurry consisting essentially of a finely-divided refractory material, a silica sol whose silica content is in the range of from 10% to 30% by weight, and from 0.05 to 1% by weight of the slurry of a non-ionic surface-active agent, said slurry having a pH such that the slurry remains homogeneous on standing, said refractory material being composed of particles which pass through a 200 mesh British Standard sieve and being selected from the group consisting of alumina, Carborundum, chromite, silica, zirconium silicate and sillimanite, said non-ionic surface-active agent being the condensation product of ethylene oxide with an organic substance containing a large non-polar group and an active hydrogen atom, the said organic substance being selected from the group consisting of long-chain fatty alcohols, alkylphenols, long-chain alkyl mercaptans, and fatty acids, the weight ratio of silica to the finely divided refractory material being from 9 to 12 parts by weight of silica for each 175 parts by weight of the refractory material.

7. The slip-casting process of claim 6 wherein the non-ionic surface-active agent is the condensation product of ethylene oxide with an alkyl phenol.

8. In a slip-casting process wherein an aqueous slurry of a finely-divided refractory material and a bonding agent is used to form a wet casting on a porous mould, the casting is dried and separated from the mould and fired to give it strength, the improvement which comprises using an aqueous slurry consisting essentially of a finely-divided refractory material, a silica sol whose silica content is in the range of from 10% to 30% by weight, and from 0.05 to 1% by weight of the slurry of a non-ionic surface-active agent, said slurry having a pH such that it remains homogeneous on standing, said refractory material being composed of particles which pass through a 200 mesh British Standard sieve and being selected from the group consisting of alumina, Carborundum, chromite, silica, zirconium silicate and sillimanite, the weight ratio of silica to the finely divided refractory material being from 9 to 12 parts by weight of silica for each 175 parts by weight of the refractory material.

9. The slip-casting process of claim 8 wherein the non-ionic surface-active agent is the condensation product of ethylene oxide with an organic substance containing a large non-polar group and an active hydrogen atom, the said organic substance being selected from the group consisting of long-chain fatty alcohols, alkylphenols, long-chain alkyl mercaptans, and fatty acids.

10. The slip-casting process of claim 9 wherein the non-ionic surface-active agent is the condensation product of ethylene oxide with an alkyl phenol.

References Cited in the file of this patent

UNITED STATES PATENTS

| | | |
|---|---|---|
| 1,364,875 | Fulton | Jan. 11, 1921 |
| 2,288,661 | Wadman | July 7, 1942 |
| 2,623,809 | Myers | Dec. 30, 1952 |
| 2,701,902 | Strachan | Feb. 15, 1955 |
| 2,799,658 | Nickerson | July 16, 1957 |
| 2,888,354 | Smith et al. | May 26, 1959 |

FOREIGN PATENTS

| | | |
|---|---|---|
| 594,671 | Great Britain | Nov. 17, 1947 |

OTHER REFERENCES

"Atlas Spans and Atlas Tweens," December 1943, pub. by Atlas Powder Co., p. 17.

"Ceramics—A Symposium," pub. 1953 by British Ceramic Soc., Stoke-on-Trent, England (pages 551–556).

Serial No. 426,244, Passelecq (A.P.C.), published June 1, 1943.